| United States Patent [19] | [11] Patent Number: 4,837,589 |
| Dodge | [45] Date of Patent: Jun. 6, 1989 |

[54] NON-CONTACT LED-ARRAY IMAGE PRINTER

[75] Inventor: Dennis W. Dodge, Amherst, N.H.

[73] Assignee: Itek Graphix Corp., Waltham, Mass.

[21] Appl. No.: 112,913

[22] Filed: Oct. 23, 1987

[51] Int. Cl.[4] ............................................. G01D 9/42
[52] U.S. Cl. .................................. 346/108; 346/76 L
[58] Field of Search ................. 346/108, 107 R, 76 L, 346/160

[56] References Cited

U.S. PATENT DOCUMENTS

| 3,019,072 | 1/1962 | Bose . | |
| 3,952,311 | 4/1976 | Lapeyre . | |
| 4,003,059 | 1/1977 | Sugiura | 346/108 |
| 4,090,206 | 5/1978 | Pfeifer . | |
| 4,096,486 | 6/1978 | Pfeifer . | |
| 4,107,687 | 7/1978 | Pfeifer . | |
| 4,307,408 | 12/1981 | Kiyohara | 346/108 |
| 4,318,597 | 3/1982 | Kotani . | |
| 4,342,504 | 8/1982 | Ebner | 346/107 R |
| 4,365,275 | 12/1982 | Berman . | |
| 4,376,282 | 5/1983 | Kotani . | |
| 4,378,149 | 3/1983 | Ebner | 354/5 |
| 4,429,319 | 6/1984 | Lofman . | |
| 4,532,526 | 7/1985 | Behrens . | |
| 4,571,602 | 2/1986 | DeSchamphlelaere . | |
| 4,619,451 | 10/1986 | Dodge . | |

FOREIGN PATENT DOCUMENTS 568593 9/1973 Switzerland .
2099221 12/1982 United Kingdom .

OTHER PUBLICATIONS

U.S. Patent Application Ser. No. 850,630 filed Apr. 11, 1986.

Primary Examiner—E. A. Goldberg
Assistant Examiner—Mark Reinhart
Attorney, Agent, or Firm—Morgan & Finnegan

[57] ABSTRACT

A non-contact LED-array image printer is provided having a scanning print head driven by a zero backlash threaded lead screw. The LED array is mounted on a substrate bearing an interface control circuit which receives video data through a ribbon cable, and the LED array is imaged by a lens onto an exposure plane on a platen parallel to the direction of scan. Means are provided for conveniently adjusting object and image distances relative to the image plane. The photosensitive medium is driven in registration in forward and reverse directions biased against the exposure platen defining the image plane. A gear, clutch and brake mechanism is provided to ensure that the photosensitive medium remains in taut registration across the exposure platen.

16 Claims, 4 Drawing Sheets

NON-CONTACT LED-ARRAY IMAGE PRINTER

TECHNICAL FIELD

The present invention relates to a non-contact LED-array image printer.

BACKGROUND AND OBJECTS OF THE INVENTION

Co-pending application Ser. No. 850,630, filed Apr. 11, 1986 entitled LED-Array Image Printer, commonly assigned with the present application and hereby incorporated by reference, discloses an LED Array Image Printer for contact or non-contact printing wherein a carriage mounted LED-array is scanned perpendicular to the direction of travel of a photosensitive medium. The carriage is scanned across the photosensitive medium by a motor and belt drive mechanism. The preferred embodiment of the foregoing application discloses a print head having a pressure foot which contacts the photosensitive medium during the scan to maintain proper positional alignment between the LED-array, imaging lens and photosensitive medium. The foregoing application also contemplates that the scanning system could be non-contact if a stable distance could be provided between the lens and the photosensitive medium.

Although the LED-Array Image Printer disclosed in the foregoing application represents a significant advance in the art of low cost, high speed image printers, it has been found that the carriage assembly and drive mechanism there disclosed do not lend themselves well to non-contact printing. In short, the carriage assembly and drive mechanism do not achieve a sufficiently stable distance between the lens and photosensitive medium to achieve a high quality non-contact printed image. Indeed, the belt driven carriage assembly of the foregoing application is relatively flexible and may experience backlash. These characteristics prevent the belt driven carriage from achieving a sufficiently stable imaging distance across the scan to provide non-contact printing.

Thus, although the advantages of non-contact printing, e.g. elimination of frictional contact between a pressure foot and the photosensitive surface, are appreciated by the foregoing application the scanning head drive carriage assembly there disclosed does not achieve sufficiently reliable stability to obtain non-contact imaging.

Therefore, it is one object of the present invention to provide an improved non-contact LED-Array Image Printer.

It is a further object of the present invention to provide, in a non-contact LED-array image printer, a drive carriage assembly which maintains a stable distance between the imaging lens and the photosensitive surface.

Another object of the present invention is to provide a carriage and drive assembly for an LED-array image printer which does not experience backlash effects.

These and other highly desirable and unusual results are accomplished by the present invention in a low cost structure which achieves high quality non-contact imaging.

Objects and advantages of the invention are set forth in part herein and in part will be readily appreciated herefrom, or may be learned by practice with the invention, the same being realized and attained by means of the instrumentalities and combinations pointed out in the appended claims.

SUMMARY OF THE INVENTION

In accordance with the invention a non-contact print head is provided wherein a linear LED array is disposed on a substrate bearing control circuitry. Video data is received via a connector cable. The substrate is fixed to a stem mounted through an opening in a substrate support base. A lens barrel is fixed to the substrate which, in turn, supports an imaging lens for imaging the LED array onto an image plane coincident to the position of the photosensitive medium. A two part rotatable helix shim disposed between the substrate and the substrate support base provides front to back positional adjustment of the substrate, lens barrel and lens relative to the imaging plane. Advantageously, scanning transport of the print head is obtained by threaded engagement of the substrate support base with a zero backlash motor driven threaded lead screw. Vibration and transfer of torque to the print head are prevented by sliding engagement of the print head with guide rails.

Accurate photosensitive medium transport and registration are achieved by a motor driven gear and roller mechanism wherein the photosensitive medium is drawn between an upper idle roller and an upper pinch roller and across to a lower drive roller which is driven by motor. A lower pinch roller contacts the lower drive roller to ensure that the photosensitive medium is advanced as the lower drive roller is driven. Between the upper and lower roller pairs the photosensitive medium is biased against a flat exposure platen disposed spaced from but parallel to the LED array and lens to ensure a fixed image distance. Advantageously, the upper pinch roller engages a brake during forward driving motion of the photosensitive medium to ensure that the photosensitive medium remains taut between the upper and lower roller pairs. For reverse drive of the photosensitive medium, a clutch driven gear mechanism is provided whereby the lower drive roller and the upper pinch roller are both driven at the same rates so that the photosensitive medium is driven in reverse while remaining taut between the upper and lower roller pairs and in close registration on the exposure platen.

Thus, the present invention provides a non-contact LED-array image printer wherein the print head is driven by a zero backlash carriage drive and the photosensitive medium is disposed at a known image plane so that the correct object to image distance can be assured. Remarkably, the photosensitive medium may be driven in forward and reverse directions while maintaining accurate registration.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate principles and preferred embodiments of the present invention, and together with the description serve to explain the principles of the invention, in which.

DETAILED DESCRIPTION OF THE PREFERRED EMBODIMENTS

Figure 1:
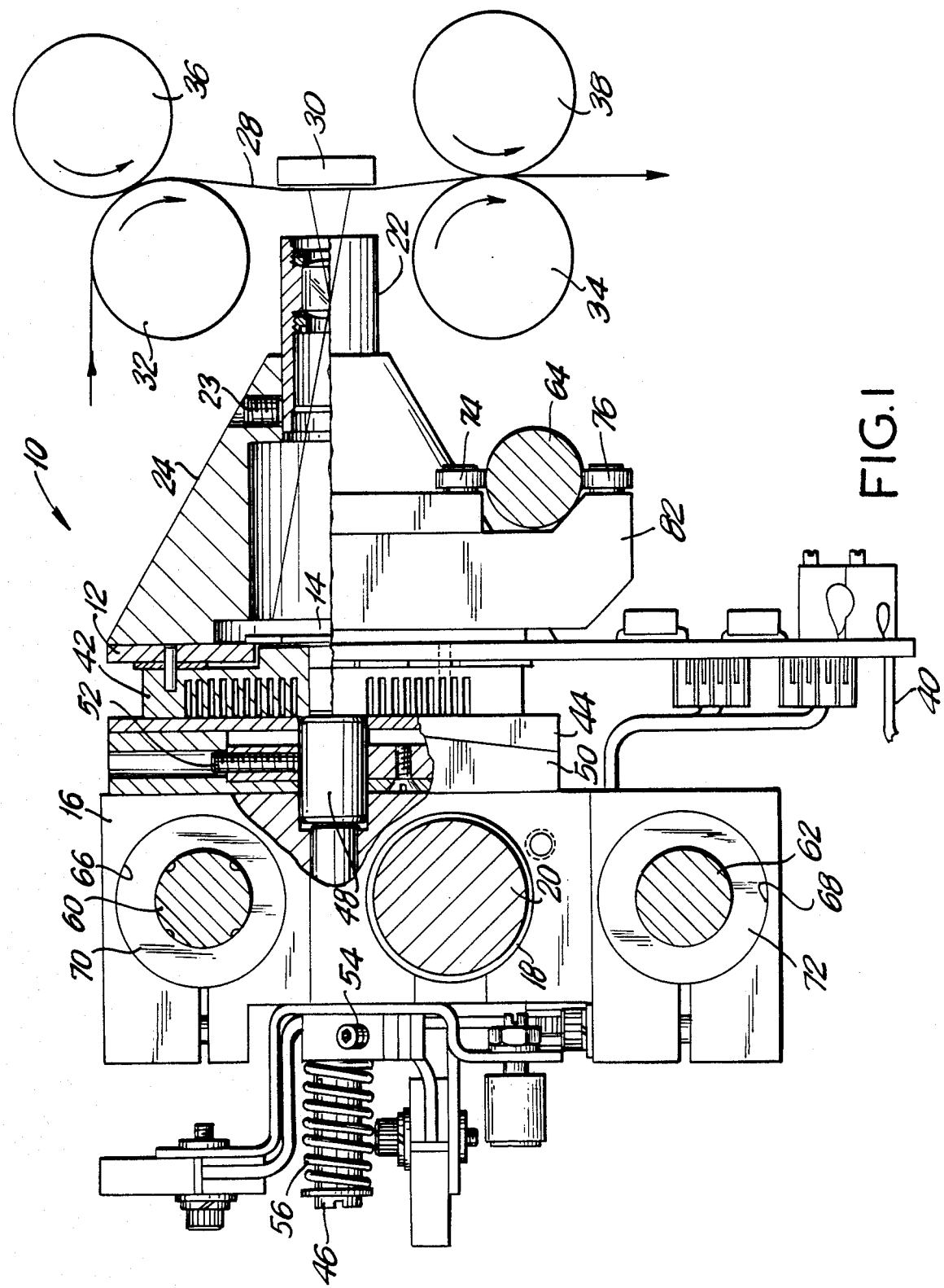
FIG. 1 is a partial sectional elevation view of a non-contact print head in accordance with the invention.

Referring now to the drawings, there is shown a non-contact LED-array image printer head 10 in accordance with the present invention, having a substrate 12 bearing an LED-array 14 and appropriate interface circuitry mounted to a substrate base 16 which, in turn, has a threaded aperture 18 for engaging a motor driven threaded lead screw 20. An imaging lens 22 is supported by a lens barrel 24 fixed to substrate 12 to image array 14 onto photosensitive medium 28 disposed across the exposure platen 30. As lead screw 20 is driven by motor 58 substrate support base 16, substrate 12, LED-array 14 and lens 22 are driven either in the direction shown by arrow 26 or in the opposite direction. During the scan the distance between lens 22 and photosensitive medium 28 disposed across platen 30 is maintained with a high degree of precision so that a high quality image of LED-array 14 is projected onto photosensitive medium 28 at all points of scan. Preferably, photosensitive medium 28 is disposed over upper idle roller 32 and lower drive roller 34 to ensure that the unsensitized rear surface of photosensitive medium 28 is biased firmly against platen 30. Upper and lower pinch rollers 36 and 38, respectively, ensure that the photosensitive medium is pinched against rollers 32, 34 during forward and reverse driving of the photosensitive medium.

Referring more specifically to FIG. 1, LED array 14 is mounted to a substrate 12 which bears appropriate interface circuitry for selectively activating individual light-emitting diodes of array 14 in response to video data received through cable connector 40. Preferably, the array is a linear array of 256 LED's provided on an integrated circuit module, such models TPMP 8160 or 7160 available from AEG Telefunken Corporation. Substrate 12, heat sink 42 abutted thereto, and front helix shim portion 44 are fixedly mounted to stem 46 extending through substrate support base 16. Front helix shim portion 44 is fixed to sleeve 48 which, in turn, is fixed to stem 46. Rear helix shim portion 50 rotates freely about sleeve 48 between front helix shim portion 44 and substrate support base 16. Alternatively, rear helix shim portion 50 may be fixed relative to sleeve 48 and stem 46 by tightening helix set screw 52. Stem 46 may be fixed against rotation relative to substrate support base 16 by tightening stem set screw 54. Spring 56 ensures that substrate 12, heat sink 42, front helix shim portion 44 and rear helix shim portion 50 are firmly held against substrate support base 16 during operation.

Figure 5:
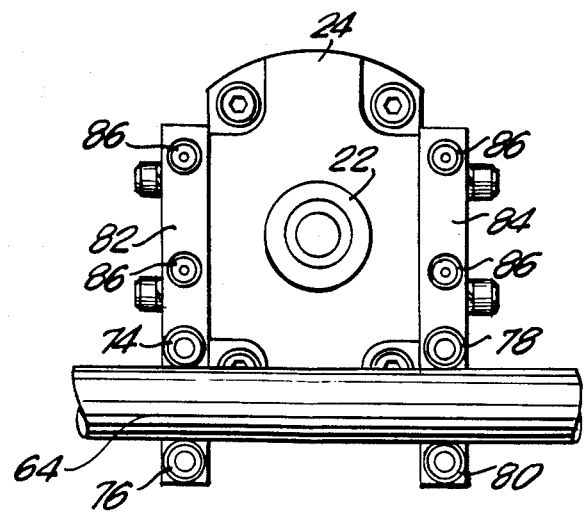
FIG. 5 is a front elevation view of the lens housing illustrating bearing engagement with the front guide rail.

As shown in FIG. 1, threaded aperture 18 engages corresponding threaded lead screw 20. As lead screw 20 is driven in one direction by a reversible carriage motor 58 (see FIG. 2), substrate support base 16 is driven in the direction of arrow 26. When lead screw 20 is driven in the opposite direction by carriage motor 58 support base 16 scans in the direction opposite to arrow 26. Unlike the belt driven scanning carriage disclosed in U.S. Pat. No. 4,342,504 to Ebner and relied upon in the aforesaid co-pending application Ser. No. 850,630, the threaded lead screw drive system in accordance with the present invention advantageously attains zero backlash. Referring again to FIG. 1, in order to prevent transfer of rotational movement from lead screw 20 to printer head 10 as a whole, guide rails 60, 62, 64 are provided. Thus, substrate support base 16 is also provided with guide rail apertures 66, 68 which slidingly engage guide rails 60 and 62, respectively, via bushings 70, 72. In addition, front guide rail 64 engages bearings 74, 76, 78, 80 mounted to bearing housings 82, 84 which, in turn, are secured by screws 86 to substrate 12 adjacent lens barrel 24 (see FIG. 5).

The printer head 10 is adjusted in the following manner. Lens barrel 24 is fastened to substrate 12 and linear array 14 is viewed through lens 22 with a microscope disposed at the nominal image plane. Lens 22 is adjusted relative to lens barrel 24 to obtain a proper object distance and is secured in place by tightening set screw 23. With print head 10 disposed on lead screw 20 and guide rails 60, 62, rear helix shim portion 50 is rotated relative to front helix shim portion 44 until the proper image distance from lens 22 to image plane 30 has been obtained. Rear helix shim portion 50 is then secured relative to sleeve 48 and front helix shim portion 44 by tightening set screw 52. The vertical alignment of the linear array may be adjusted by rotating stem 46, after which set screw 54 is tightened to secure the stem against further rotational movement. Finally, bearing housings 82, 84 are positioned adjacent to lens barrel 24 so that bearings 74, 76, 78, 80 engage front guide rail 64 and bearing housing set screws 86 are tightened to secure the substrate and lens barrel assembly relative to front guide rail 64.

Figure 2:
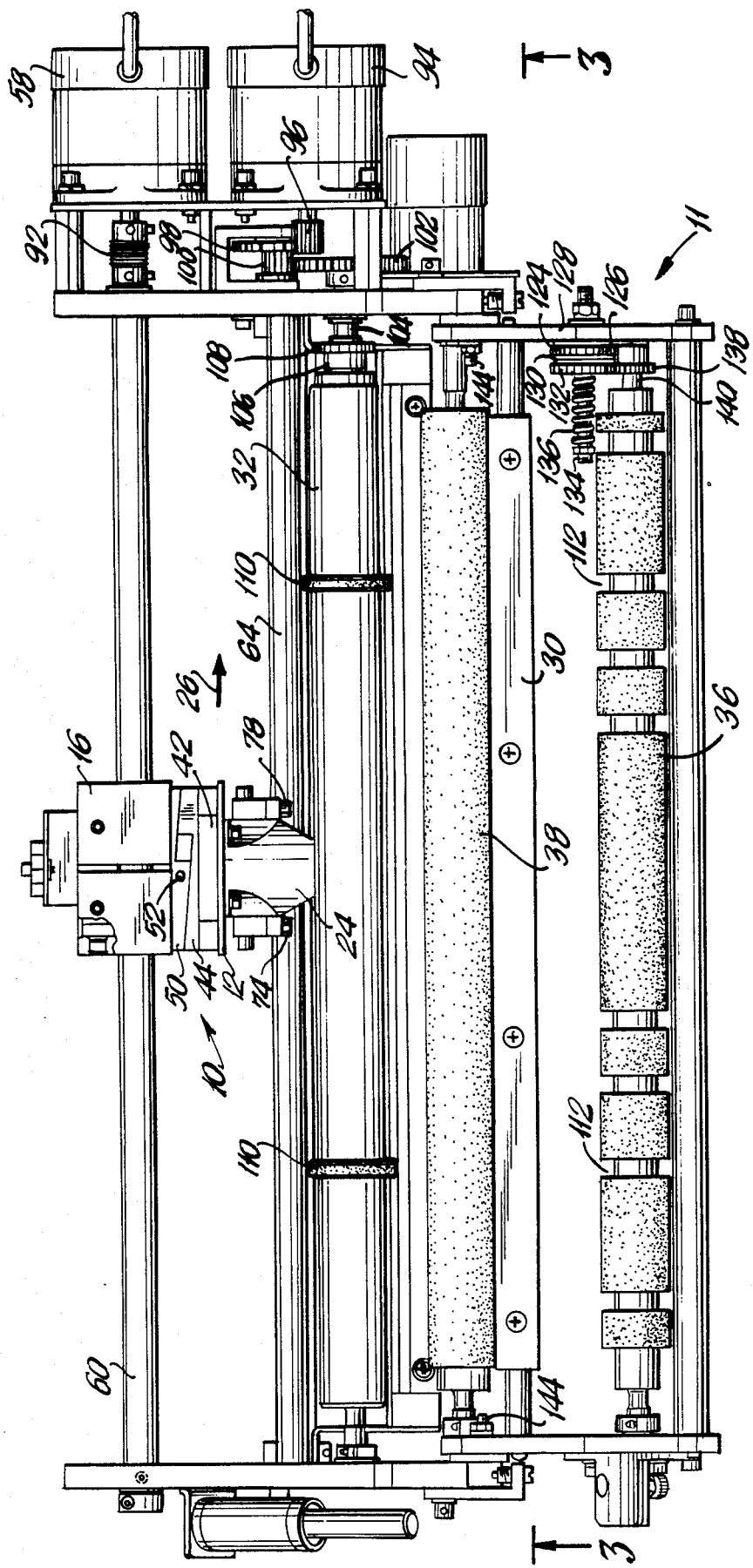
FIG. 2 is a top plan view of a printhead drive carriage and photosensitive medium control mechanism in accordance with the invention.

FIG. 2 is a top plan view of the drive carriage assembly of the present invention with the pinch roller/platen assembly 11 in an open, film loading position pivoted away from upper roller 32 and lower drive roller 34. As shown, carriage motor 58 drives the lead screw via connection joint 92 in order to control the transverse scan position of LED-array image printer head 10. The lead screw itself is obscured in FIG. 2 by top guide rail 60.

As an integral part of the present invention a precision photosensitive medium drive mechanism is provided. Thus, a photosensitive medium drive motor 94 drives the lower drive roller 34 via an appropriate gear reduction assembly having first, second, third and fourth gears 96, 98, 100, 102. Gear 102 is secured to drive shaft 104 and lower drive roller 34 (see FIG. 3) is fixedly mounted to shaft 104. Also mounted to drive shaft 104 is a one way drive shaft clutch 106 and associated gear 108. As shown in FIG. 2, lower pinch roller 38 is pivoted away from the lower drive roller and upper pinch roller 36 is pivoted away from upper idle roller 32. Upper idle roller 32 is preferably a stainless steel roller having adjustable rubber guide rings 110 which engage corresponding recessed openings 112 in rubberized upper pinch roller 36. As shown, upper pinch roller 36 is provided with various sets of recessed openings corresponding to standard widths of photosensitive media, e.g. paper or film, used with the image printer according to the invention. Advantageously, since upper pinch roller 36 will not properly engage upper idle roller 32 unless guides 110 are properly aligned with recessed openings 112 in upper pinch roller 36, and since guides 110 position the photosensitive medium relative to upper idle roller 32, the interaction of paper guides 110 and recessed openings 112 helps ensure that the photosensitive material is properly oriented when loaded across upper idle roller 32 and, consequently, throughout the drive system. Finally, since exposure platen 30 is mounted onto the pivoting pinch roller/platen assembly the platen is also displaced from the exposure position in the position shown in FIG. 2.

Figure 3:
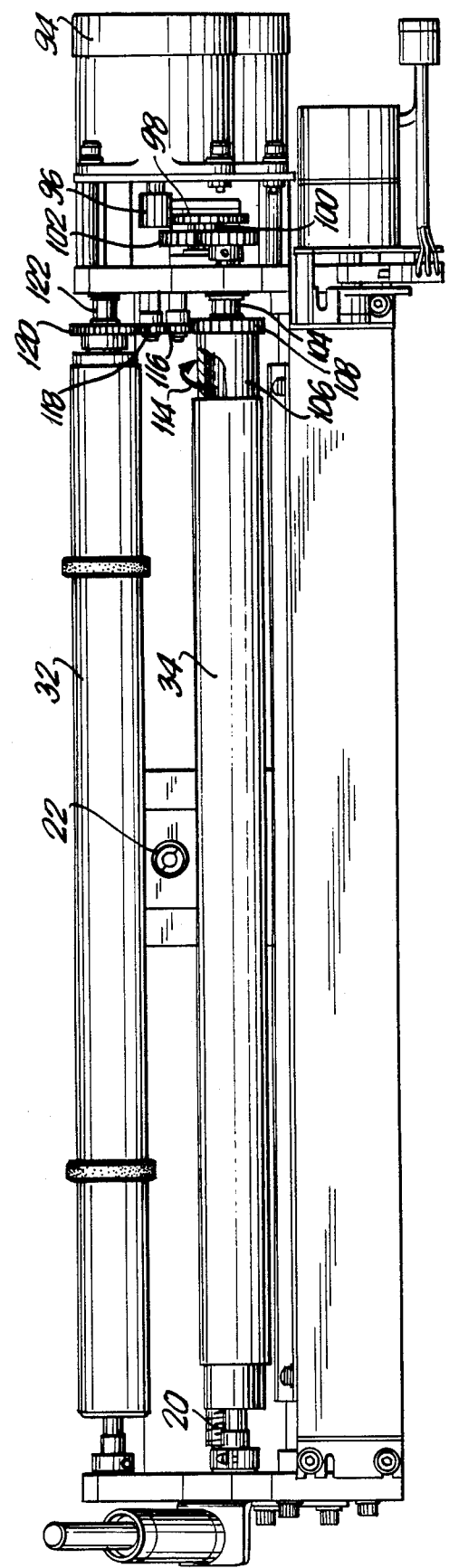
FIG. 3 is a front elevation view of the carriage and photosensitive medium control mechanism shown in FIG. 2 but with the pivoting pinch roller frame removed, taken along line 3—3 of FIG. 2.

FIG. 3 is a front elevation view taken along line 3—3 of FIG. 3 illustrating the relative positions of upper idle roller 32 and lower drive roller 34. The pivoting pinch roller/platen assembly has been removed from the view shown in FIG. 3. Threaded lead screw 20 is partially visible behind lower drive roller 34 and the relative position of lens barrel 22 is visible. As previously explained, motor 94 drives gears 96, 98, 100 and 102 to drive shaft 104 and lower drive roller 34 fixedly mounted thereto. When drive shaft 104 and lower drive roller 34 are driven in the forward direction opposite to the direction indicated by arrow 114 drive shaft clutch 106 slips and gear 108 idles and is not driven. However, when drive shaft 104 is driven in the reverse direction indicated by arrow 114, drive shaft clutch 106 becomes engaged and drives gear 108. Gear 108 engages idle gears 116, 118, 120. Thus, when gear 108 is driven each of gears 116, 118, 120 are also driven. When gear 108 is not driven all of gears 108, 116, 118 and 120 are idle. It should be noted that gear 120 merely idles on shaft 122 of upper idle roller 32 and does not at any time drive roller 32.

When the pivoting pinch roller/platen assembly is pivoted into the operating position wherein upper pinch roller 36 contacts upper idle roller 32 and lower pinch roller 38 contacts lower drive roller 34, gear 120 engages gear 124 (see FIG. 2). As shown in FIG. 2, a brake pad 126 is provided between gear 124 and pivoting frame 128 and a pinch roller clutch 130 is provided between gears 124 and 132, all commonly mounted on a variable tension screw shaft 134. The pressure between brake pad 126, gear 124, clutch 130 and gear 132 is adjustable by rotating screw shaft 134 to adjust the pressure exerted on the aforementioned components between frame 128 and compression spring 136. Gear 132 engages upper pinch roller gear 138 commonly fixed with roller 36 to upper pinch roller shaft 140.

Figure 4A:
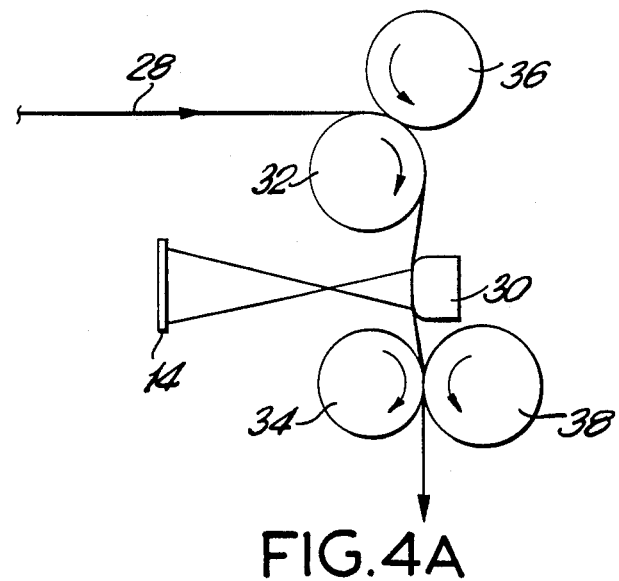
FIG. 4A is an end view schematic illustration of the path of the photosensitive medium through the drive, idle and pinch rollers and biased across the exposure platen.
Figure 4B:
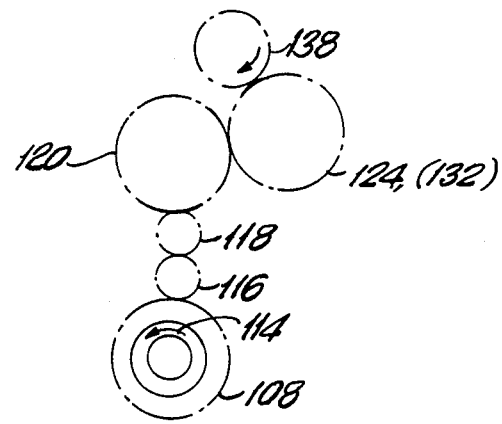
FIG. 4B is an end view schematic illustration of the idler and drive gear mechanism for driving the photosensitive medium in reverse direction.

The functional relationship of rollers 32, 34, 36, 38 and the related gear mechanism is best described with reference to FIGS. 4A and 4B. FIG. 4A is a functional diagram of the path of the photosensitive medium through the rollers and across the exposure platen. FIG. 4B is a functional diagram of the gear mechanism for controlling lower drive roller 34 and upper pinch roller 36. Rollers 36 and 38 are idle rollers.

As shown in FIG. 4A, photosensitive medium 28, e.g. film or paper, is fed from a supply, such as a disposable light-tight cassette, between upper idle roller 32 and upper pinch roller 36, across platen 30 and between lower drive roller 34 and lower pinch roller 38. As illustrated, photosensitive medium 28 is braced against platen 30 to maintain a flat image surface onto which LED-array 14 is imaged during each scan to expose the photosensitive material. During forward advancing of film or paper 28 lower drive roller 34 is driven by a shaft 104, with clutch 106 and gears 108, 116, 118 and 120 idle (see FIG. 2). During forward drive upper idle roller 36 rotates by the friction of photosensitive medium 28 drawn between idle roller 32 and pinch roller 36. Upper pinch roller 36 in turn drives gear 138 and gears 132, 124. In order to maintain tension on photosensitive medium 28 during forward motion brake pad 126 applies tension to upper pinch roller 36 to prevent roller 36 from rotating freely.

At times during generation of the printed image it may be desirable to drive the photosensitive medium in the reverse direction. For example, in order to compose graphics and text of differing resolutions, such as 800 and 1600 dots per inch, it may become necessary to scan a region of photosensitive medium 28 twice sequentially, driving LED-array 14 at differing resolutions during each scan. In order to accomplish this double scan it is necessary to drive photosensitive medium 28 in reverse while maintaining close registration between the first and second exposure scans. However, the photosensitive medium 28 cannot be maintained in close registration if lower drive roller 34 is merely driven in reverse to push the photosensitive medium upwards. Therefore, it becomes necessary to drive at least one of the upper rollers to pull the photosensitive material upward. At the same time appropriate tension must be applied by the lower rolls to the photosensitive medium to maintain accurate registration of the photosensitive medium. In accordance with the invention, the photosensitive medium is driven backwards in registration as follows.

Shaft 104 is driven in the reverse direction indicated by arrow 114 by reversing motor 94, therby engaging clutch 106 to drive gears 108, 116, 118, 120 and 124. Gear 124 drives gear 132 across clutch 130 in order to drive gear 138 and upper pinch roller shaft 140. In this manner upper pinch roller 36 is driven in the direction of arrow 142 to pull the phosensitive medium upward between rollers 32, 36. Clutch 130, together with the final ratio of gears 108, 116, 118, 120, 124, 132 and 138, ensure that upper pinch roller 36 rotates at the same rate as lower drive roller 34 to obtain one to one correspondence between movement of the photosensitive medium across lower roller 34 and upper roller 36, thereby maintaining registration.

Thus, driving shaft 104 in reverse effectively drives both lower drive roller 34 and upper pinch roller 36 in reverse to drive the photosensitive medium backwards in accurate registration for sequential scanning of the same region.

In use, photosensitive medium such as film of paper is led from a photosensitive material supply (not shown) across upper idle roller 32 between guides 110 and across drive roller 34 with the pivoting pinch roller/platen assembly in the open positon shown in FIG. 2. The pivoting pinch roller/platen assembly is then rotated about pivot points 144 to rotate the pinch rollers 36, 38 into contact with upper idle roller 32 and lower drive roller 38, respectively. In this manner platen 30 is disposed between rollers 32, 34 so that photosensitive medium 28 is biased out of a direct line of travel between the roller pairs toward the print head to ensure a constantly flat image plane. Upon loading the photosensitive medium in this manner the printer can be activated to commence automatic scanning and photosensitive medium advance under computer control.

Thus, the present invention obtains a non-contact LED-array image printer wherein the print head is driven by a zero backlash positive engagement lead screw while the photosensitive medium is maintained biased against a platen to define a fixed image distance throughout scanning. The guide rails prevent translation of torque from the lead screw to the print head. In addition, the roller and gearing mechanism provide positive forward and reverse photosensitive medium advance in registration for multiple scanning. Advantageously, non-contact printing permits use of photosensitive materials which previously would have been subject to abrasion by a contact printing head or which would have caused abrasion damage to the print head. As a further advantage of the present invention the remarkable registration obtained between the scanning printhead and photosensitive medium due to the synergistic combination of the lead screw and photosensitive medium drive mechanisms obtains an entirely new generation of low cost high quality image printer. Thus, the high resolution and registration obtainable with the present invention opens up entirely new market segments for low cost high quality image printers. By way of example only, it is contemplated that dots of varying size and shape may be created with the present invention, thereby permitting the simulation of halftone screen effects.

To the extent not already indicated, it will be understood that the invention in its broader aspects is not limited to the specific embodiments herein shown and described but departures may be made therefrom within the the scope of the accompanying claims without departing from the principles of the invention and without sacrificing its chief advantages.

What is claimed is:

1. A non-contact LED-array printer for imaging on a photosensitive medium comprising:
    an integrated circuit substrate bearing an LED-array and an interface circuit electrically connected to said array for controlling the activation of each light emitting diode in said array;
    a drive carriage for transporting said integrated circuit substrate across the photosensitive medium perpendicular to the direction of travel of the photosensitive medium to allow said LED-array to scan the photosensitive medium, said carriage including,
    (i) a substrate support base for supporting said substrate, said base having a threaded aperture therethrough parallel to the direction scan, said substrate support base also having at least one guide rail aperture therethrough parallel to the direction of scan;
    (ii) a motor driven threaded lead screw engaging said threaded aperture, such that said support base and said substrate scan across the photosensitive medium as said lead screw is driven;
    (iii) at least one guide rail parallel to said threaded lead screw engaging said guide rail aperture;
    an exposure platen defining an exposure image plane parallel to the direction of scan of said substrate;
    photosensitive drive means for driving the photosensitive medium across said exposure platen with the unsensitized surface thereof biased against said platen and with the sensitized surface thereof in spaced facing relationship to said integrated circuit substrate.

2. The image printer according to claim 1 wherein said substrate is mounted to a stem selectively rotatably engaging a stem aperture provided in said support base perpendicular to the direction of scan.

3. The image printer according to claim 2 further comprising a two part helical spacer disposed between said substrate and said substrate support base.

4. The image printer according to claim 3 further comprising lens means disposed between said array and the photosensitive medium and spaced apart from the photosensitive medium for focusing an image of said array onto the photosensitive medium.

5. The image printer according to claim 4 wherein said lens means further comprises a lens barrel secured to said substrate and an imaging lens supported by said lens barrel between said array and the photosensitive medium.

6. The image printer according to claim 5 further comprising at least one bearing housing secured to said substrate, said bearing housing supporting at least one pair of opposed bearings engaging at least one substrate guide rail.

7. The image printer according to claim 4 wherein said photosensitive drive means further comprises an upper idler roller and a lower drive roller, the photosensitive medium traversing said upper idler roller and said lower drive roller and being biased against said exposure platen disposed therebetween.

8. The image printer according to claim 7 further comprising an upper pinch roller contacting said upper idle roller and a lower pinch roller contacting said lower drive roller.

9. The image printer according to claim 8 further comprising brake means coupled to said upper pinch roller for applying tension to said upper pinch roller to ensure that the photosensitive medium remains taut when drawn in a forward direction by said lower drive roller.

10. The image printer according to claim 9 further comprising clutch activated gear means for driving said upper pinch roller in a reverse direction when said lower drive roller is driven in a reverse direction in order to drive the photosensitive medium in a reverse direction.

11. The image printer according to claim 10 wherein said lower drive roller and said upper pinch roller both impart the same speed to the photosensitive medium to maintain the photosensitive medium taut between the driven upper pinch rollers and the lower drive roller as the photosensitive medium is driven in the reverse direction.

12. A non-contact LED-array printer for imaging on a photosensitive medium, comprising:
    an integrated circuit substrate bearing an LED-array and an interface circuit electrically connected to said array for controlling the activation of each light emitting diode in said array;
    a drive carriage for transporting said integrated circuit substrate across the photosensitive medium perpendicular to the direction of travel of the photosensitive medium to allow said LED-array to scan the photosensitive medium, said drive carriage including
    (i) a substrate support base for supporting said substrate, said base having a threaded aperture therethrough parallel to the direction of scan, said substrate support base also having at least one guide rail aperture therethrough parallel to the direction of scan, said guide rail aperture engaging a guide rail, (ii) a motor driven threaded lead screw disposed parallel to said guide rail, said threaded lead screw engaging said threaded aperture, so that said support base and said substrate scan across the photosensitive medium as said lead screw is driven;

exposure platen means for defining an image plane parallel to the direction of scan, the rear surface of the photosensitive medium being biased against said exposure platen means, the photosensitive surface facing said integrated circuit substrate;

lens means disposed between said LED array and the photosensitive medium, said lens means being spaced from the photosensitive medium, said lens means focusing an image of said LED array onto the photosensitive medium;

photosensitive medium drive means for driving the photosensitive medium across said exposure platen means in a direction perpendicular to the direction of scan, said photosensitive medium drive means including an upper idle roller and a lower drive roller, the photosensitive medium traversing said upper idle roller and said lower drive roller, the rear surface of the photosensitive medium being biased against said exposure platen means between said upper idle roller and said lower drive roller.

13. The image printer according to claim 12 wherein said photosensitive medium drive means further includes an upper pinch roller contacting said upper idle roller and a lower pinch roller contacting said lower drive roller.

14. The image printer according to claim 13 further comprising brake means coupled to said upper pinch roller for applying tension to said upper pinch roller to ensure that the photosensitive medium remains taut when drawn in a forward direction by said lower drive roller.

15. The image printer according to claim 14 further comprising clutch activated gear means for driving said upper pinch roller in a reverse direction when said lower drive roller is driven in a reverse direction in order to drive the photosensitive medium in a reverse direction.

16. The image printer according to claim 15 wherein said lower drive roller and said upper pinch roller both impart the same speed to the photosensitive medium to maintain the photosensitive medium taut between the driven upper pinch roller and the lower drive roller as the photosensitive medium is driven in the reverse direction.

* * * * *